E. L. GALE, Sr.
SYSTEM OF MOTOR CONTROL.
APPLICATION FILED OCT. 9, 1907.

965,175.

Patented July 26, 1910.

Witnesses:
Ernest L. Gale Jr.
James G. Bethell

Inventor
Ernest L. Gale, Sr.

By
C. M. Nissen, Attorney

UNITED STATES PATENT OFFICE.

ERNEST L. GALE, SR., OF YONKERS, NEW YORK, ASSIGNOR TO OTIS ELEVATOR COMPANY, OF JERSEY CITY, NEW JERSEY, A CORPORATION OF NEW JERSEY.

SYSTEM OF MOTOR CONTROL.

965,175.          Specification of Letters Patent.      Patented July 26, 1910.

Application filed October 9, 1907. Serial No. 396,533.

*To all whom it may concern:*

Be it known that I, ERNEST L. GALE, Sr., a citizen of the United States, residing at Yonkers, in the county of Westchester and State of New York, have invented a new and useful Improvement in Systems of Motor Control, of which the following is a specification.

My invention relates to the control of electric motors, and one of its objects is to provide improved means whereby the starting and accelerating of an electric motor under various conditions is efficiently and automatically controlled, and to these ends it includes substantially the various features of construction and arrangement of parts having the general mode of operation substantially as hereinafter more particularly pointed out.

The accompanying drawings illustrate diagrammatically various modifications of my invention.

Like reference characters designate similar parts throughout the various views.

Figure 1:
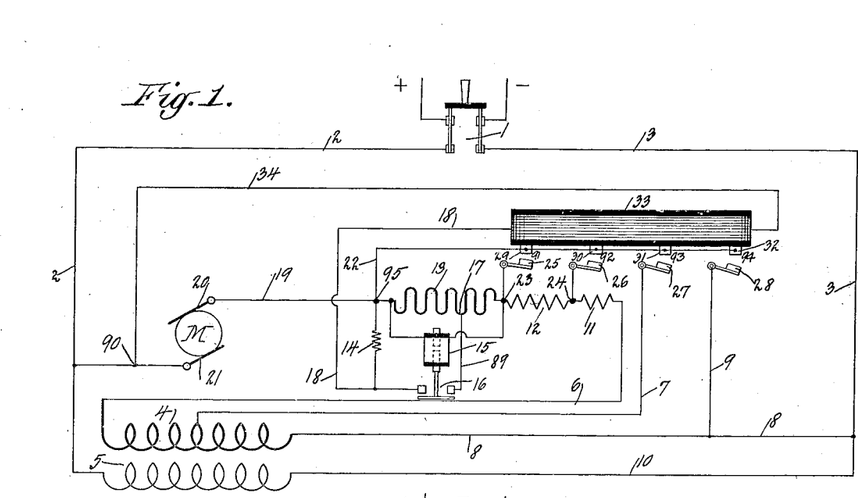
Figures 1, 2, 3, 4 and 5 show various ways of applying my invention to effect the control of an electric motor.
Figure 2:
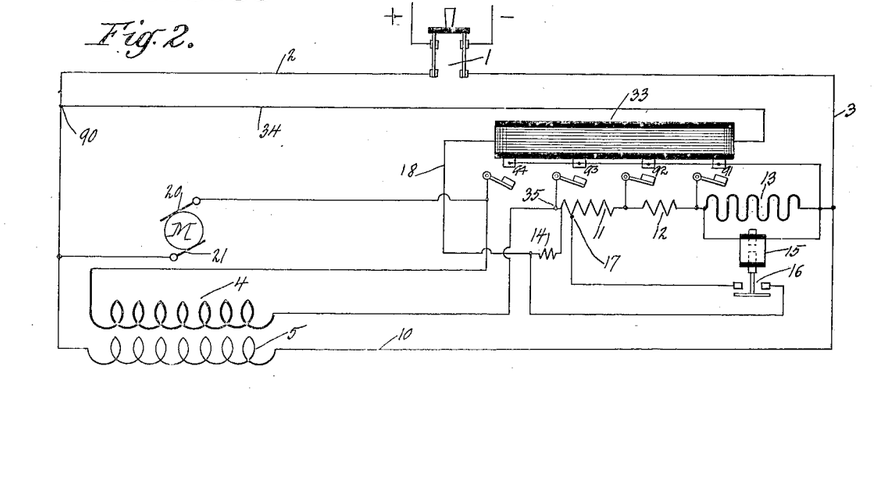
Figure 3:
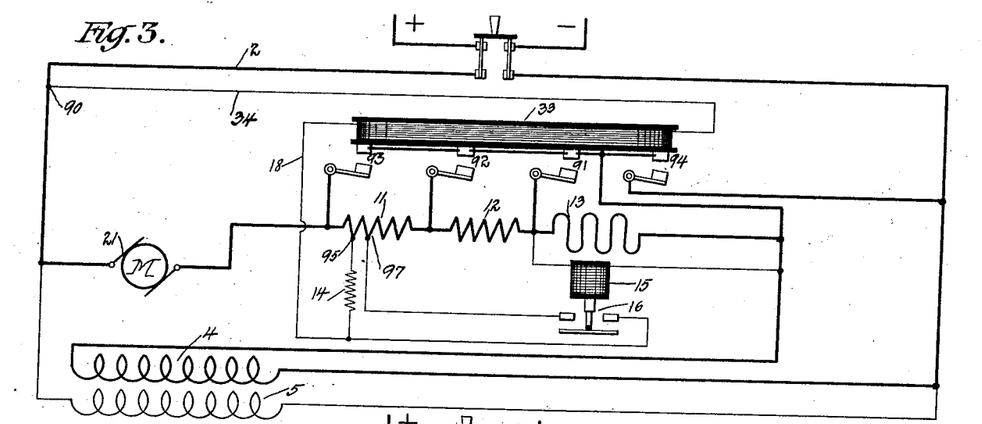

Figs. 1, 2 and 3 are very similar, the essential difference being in the relative positions of the motor, starting resistances and the series field winding.

Referring more particularly to Figs. 1, 2 and 3, 1 designates a main line two-pole switch which serves to connect the positive and negative supply mains, + and —, respectively, and leading from a suitable source of current supply, to the motor controlling system by means of the wires or conductors 2 and 3. M designates an electric motor armature provided with brushes 20 and 21, while 4 and 5 designate respectively the series and shunt field windings. 13 designates a resistance of relatively high temperature co-efficient, that is, a self-increasing resistance, in that as the current through the same continues to flow the resistance will become heated and increase in ohmic value. 12 and 11 designate resistances of relatively low temperature co-efficient, or such resistances as are not appreciably self-increasing or self-reducing. 33 designates an accelerating magnet for controlling the switches 91, 92, 93 and 94. 15 designates an electro-magnet for controlling the switch 16, and 14 designates an auxiliary resistance normally in series with the winding of the accelerating magnet.

Assuming that the main line switch 1 is closed in Fig. 1 and that the mains + and — are connected to a suitable source of current supply of the proper potential, current will flow by wire 2 and brush 21 through the motor armature M to brush 20, and thence by wire 19 through the self-increasing resistance 13, the ordinary resistances 12 and 11, conductor 6, series field winding 4, and conductors 8 and 3 to the negative main. The shunt field winding 5 is connected directly across the mains by the conductor 2 on one side and the conductors 10 and 3 on the other. The accelerating magnet 33 is connected by the conductor 34 to the armature brush 21, and by the conductor 18 and resistance 14 to the brush 20. The accelerating magnet is therefore in series with the resistance 14 in a circuit connected directly across the motor armature. Since the motor armature and field circuits are closed, the motor will start, the resistances 13, 12 and 11 allowing sufficient current to pass provided the motor is not overloaded. Since the accelerating magnet 33 is connected across the motor armature, it does not receive sufficient current to close the switches 91, 92, 93 and 94 until after the motor has started, because before the switch 91 is closed the drop of potential across the motor armature is at a minimum, substantially all of the drop being across the starting resistances 13, 12 and 11 and series field 4. When the motor armature begins to rotate, however, the drop across the latter gradually increases, so that the accelerating magnet becomes gradually strengthened until the latter has sufficient strength to close the switch 91 by lifting the armature 25 against the pole 29, the said armature pole being also a contact of the switch 91. The closure of the switch 91 short-circuits the self-increasing resistance 13 through the low resistance conductor 22. This enables the motor to receive more current and increase in speed until the potential across the brushes is such that the accelerating magnet 33 closes the switch 92 by attracting the contact 26 against the pole 30 and short-circuiting the resistance section 12. This produces a further increase in the motor speed until the switch 93 is operated to closed position by the connection of the contacts 27 and 31, thereby short-circuiting the section 11 of the starting resistance and also a portion of the series field winding 4. As the motor increases still further in speed and the accelerating magnet becomes still stronger, the switch 94 is finally operated by the connection of the contacts 28 and 32, thus short-circuiting the remaining section of the series field winding, after which the motor accelerates to full normal speed and operates as a simple shunt motor.

The above operation is repeated every time the motor is started provided the load upon the motor is normal. If the load should be a little above normal the starting resistance would not let sufficient current pass to enable the motor to receive sufficient power to move the load. Consequently the accelerating magnet would not operate to short-circuit the starting resistance, and the latter after a time would therefore become over-heated. One of the objects of my invention is to provide automatic means for starting the motor, even though the same be overloaded. This I accomplish by means of a switch 16 and an electro-magnet 15 and connections between the same and the high temperature co-efficient resistance or self-increasing resistance 13. This resistance 13 is preferably made of iron wire, galvanized if desired to prevent rusting, or it may be made of any other material having a relatively high temperature co-efficient, so that as current flows through the same the resistance thereof will be increased automatically at a predetermined rate. In this instance the magnet 15 is connected to the terminals of the resistance 13, and therefore is made to depend for its operation upon an increased difference of potential across the resistance 13, the electro-magnet being so adjusted that normally it does not become sufficiently energized to close the normally open switch 16 operatively connected thereto. If the main switch 1 is closed and the motor refuses to start, or if it starts and operates at very slow speed so that current will flow through the starting resistance for too long a time, the potential across the resistance 13 is at first not sufficient to effect the energization of the magnet 15. As the current continues to flow, however, the resistance 13 becomes heated, and owing to its relatively high temperature co-efficient its resistance increases, thus increasing the drop of potential across the resistance 13 and therefore also across the terminals of the magnet 15. In other words, the resistance 13 and magnet 15 are connected in parallel and a certain amount of current will flow through each path, and when the resistance of the path including the resistance 13 increases more current will flow through the path containing the magnet 15 until a predetermined length of time elapses when the latter will be sufficiently energized to close the switch 16, thereby electrically connecting one terminal of the accelerating magnet 33 to some point in the armature circuit or in the starting resistance, as the point 17 on the resistance 13, by way of the conductors 18 and 89.

The closure of the switch 16 in Fig. 1 takes the resistance 14 from in series with the winding of the electro-magnet 33 and places it in parallel with a portion of the resistance 13 in the armature circuit. The starting resistance is therefore somewhat reduced, but the principal effect produced is that the potential applied to the accelerating magnet 33 is increased, since it is now connected between the brush 21 and the point 17 or across the motor armature and a portion of the starting resistance in series with each other. There being an overload the armature resistance will be very low, but when the resistance is connected in the manner explained by the switch 16 more current will be shunted through the accelerating magnet to make the latter more powerful. This will be evident when it is noted that from the point 90 the current flows through two paths, one through the conductor 34, accelerating magnet 33, conductor 18, switch 16 and conductor 89 to the point 17; and the other from the point 90 through the armature M, conductor 19 to the junction 95, and thence through the resistance 14 and a portion of the resistance 13 in parallel with each other to the point 17. If the current passing through the accelerating magnet 33, due to the increased potential across its terminals, is now sufficient the switch 91 will be operated to closed position to short-circuit the resistance 13 and also the magnet 15, thus allowing the resistance to cool and preventing magnet 15 from consuming current. The resistance 14 will therefore again be placed in series with the accelerating magnet winding, but it should be understood that it requires much less power for the accelerating magnet to hold the switch 91 closed than to first operate it to closed position. The accelerating magnet will therefore still have sufficient strength to hold the switch 91 in closed position. The resistance 13 having been cut out, the current through the motor may be sufficient to cause the motor to accelerate and one or more of the remaining accelerating switches to be closed. The motor, however, under the present conditions of overload, does not accelerate to full speed since the potential across the motor does not reach a value sufficiently high to enable the accelerating magnet 33 to close the last switches. This is due to the relatively low counter-electromotive force of the motor armature rotating at lower speed under overloaded conditions. At least the last switch 94 must therefore remain open and a portion of the series field remain in circuit. In this connection it will be noted that while the switch 94 is open, the accelerating magnet 33 does not receive the full line potential, owing to the drop in potential through the portion of the field winding 4 which is at this time in series with the armature. This difference in potential may be sufficient to control the operation of the switch 94; in other words, the drop in potential across the mains on the one hand might be ample to effect the closing of the switch 94 while on the other hand the fall of potential through the accelerating magnet would be insufficient to operate said switch. It is to be further noted that there is found in practice to be a material difference between the line potential with a light load and with a heavy load. This drop in potential across the mains as the load increases is in itself sufficient to control the switch 94 so that it would operate with a light load and fail to operate with an overload.

The heavier current flowing through the series field, due to the overload on the motor, produces a powerful magnet field which causes the motor to run at slow speed but with stronger torque. It will therefore be seen that a slow speed of the motor under overload conditions is automatically produced, and this I consider a valuable safety feature of my invention. This is for the reason that an electric motor, particularly in an elevator system, is designed to lift its normal load at normal full speed, and in order to insure a constant speed it is necessary to have a substantially constant field strength and this necessitates a shunt wound motor. While it is customary to provide such a motor with a series field, in order that the field strength may be gradually increased while starting a load so as to keep the starting current at a minimum, the series field is usually cut out of circuit after the motor has started and the same thereafter runs at its normal full speed with the shunt field winding alone excited. Furthermore, the usual type of motor controlling apparatus starts and accelerates the motor to full speed by first cutting out the starting resistance and then the series field, if such is used. Such controlling means operates substantially in the same manner, regardless of the load upon the motor, and the period of time in which the current is first supplied to the motor. It is readily seen that when a motor is overloaded or loaded beyond a predetermined limit and the motor is started and accelerated to full speed in the usual manner the motor is required to operate such overload at its full speed, which might injure the motor armature. My invention provides especially for this overload feature, in that it automatically operates to bring the motor to full speed by gradually short-circuiting the starting resistance and then cutting out the series field if the load on the motor is normal or below a predetermined limit, but where the load is somewhat above normal the series field or a portion thereof will remain in circuit with the motor armature and the motor is therefore enabled to lift or actuate this overload at slow speed and maximum torque with little danger of injury to the motor armature.

By adjusting the positions of the movable contacts of the accelerating switches either the last switch 94 alone may be left open or both the switches 93 and 94. In this way it is possible to keep in circuit either the entire series field winding or only a portion thereof, or, as in Fig. 1, the entire series field winding 4 and a portion 11 of the starting resistance may be left in circuit with the motor armature. Such adjustments may be carried to any refinement desired, depending upon the number of steps in which the starting resistance and series field winding are cut out. If, however, the overload on the motor upon starting is excessive and the current flowing through the motor armature and series field limited by the starting resistances is not sufficient to allow the motor to start even after the resistance 13 has been short-circuited, the accelerating magnet 33 will not operate to short-circuit the resistances 12 and 11 and the series field winding 4, since the motor is not generating any counter-electromotive force. The accelerating magnet will therefore receive little current, since the greatest drop of potential is across the resistance 12 and 11 and not across the armature M at this time, the resistance in the latter being comparatively low.

It is readily seen from the foregoing that not only is the starting and accelerating of the motor under ordinary loads entirely automatic, but also when the motor is overloaded to some extent, sufficient starting resistance is automatically cut out of circuit to allow the motor to start, unless, of course, the overload is excessive, in which case the remaining starting resistance is kept in circuit, thereby protecting the motor from damage caused by an abnormal flow of current.

In the modification illustrated in Fig. 2 one terminal of the accelerating magnet 33 is connected to the brush 21 as in Fig. 1, while the other terminal is connected through the auxiliary resistance 14 to one extremity of the section 11 of the starting resistance at the point 35. While in Fig. 1 the accelerating magnet 33 is connected in series with the auxiliary resistance 14 in a circuit connected across the motor armature, in Fig. 2 the accelerating magnet 33 is connected in series with the auxiliary resistance 14 in a circuit in parallel to a circuit containing the motor armature and the series field winding 4 in series with each other. Furthermore, in Fig. 2 the entire series field, except on overload, is cut out of circuit by the last switch 94 to be operated to closed position after all the starting resistances have been cut out of circuit. In Fig. 2 the accelerating switches operate from right to left, whereas in Fig. 1 they operate from left to right.

The operation of Fig. 2 on overload is as follows. Assuming the switch 1 to be closed and connected to a suitable source of current supply, current will flow through the armature M, series field winding 4 and sections 11, 12 and 13 of the starting resistance to the negative lead 3. Current will also flow through the shunt field circuit 5 by way of the conductor 10. The accelerating magnet 33 receives current through the conductor 34 from the point 90 and through the conductor 18 and resistance 14 to the point 35. The load being above normal the resistance of the circuit including the armature and the series field 4 will be very low and the accelerating magnet cannot close any of its switches. As the current continues to flow the self-increasing resistance 13 causes more current to be shunted through the electromagnet 15 until finally or after a predetermined time passes the latter closes the switch 16, whereupon the resistance 14 will be removed from the circuit including the accelerating magnet 33 and placed in parallel with a portion of the starting resistance 11. The potential applied to the accelerating magnet 33 will therefore now be established between the point 90 and the point 17 and including in circuit the motor armature, the series field winding 4 and the resistance 14 and a portion of the resistance 11 in parallel with each other. Provided the load is not excessive this will cause the electro-magnet 33 to receive sufficient current to close the switch 91. The closure of the latter switch will short-circuit the resistance 13 and the electro-magnet 15, whereupon switch 16 will again be opened and the resistance 14 again be placed in the circuit with the magnet 33. But as before explained, less power is required to hold the switch 91 closed than to first close it. The motor may therefore start upon receiving more current, due to the short-circuiting of the resistance 13, and as the motor accelerates the accelerating magnet 33 will increase in power to operate one or more of the succeeding switches but not all, at least the switch 94 remaining in open position, thus keeping the series field in circuit, which will cause the motor to operate with strong torque but at slow speed.

In Fig. 3 the accelerating magnet 33 and auxiliary resistance 14 are in series with each other in a circuit connected between the points 90 and 95 or across a portion of the armature circuit including the armature M and a small portion of the starting resistance 11. The series field winding 4 is arranged to be cut out in one step by the switch 94 which operates last. The general operation of Fig. 3 is about the same as in Figs. 1 and 2. In each case the motor is started and accelerated to full speed except in cases of overload, by first short-circuiting the self-increasing resistance or high temperature co-efficient resistance 13, after which the remaining sections of the starting resistances are short-circuited step by step and finally the series field winding is short-circuited and the motor runs at full speed as a simple shunt motor, except in cases of overload.

In each of Figs. 1, 2 and 3 it will be noticed that one terminal of the accelerating magnet is connected to the brush 21 and in each figure the electro-magnet 33 is connected in series with the auxiliary resistance 14, but the latter is connected differently in each figure to the starting resistance to show various ways in which the accelerating magnet may be strengthened when the self-increasing resistance is cut out. The overload feature in each case is also substantially the same, in that where it is desired to start the motor with an overload the starting current rapidly heats the high temperature coefficient resistance or self-increasing resistance 13, thereby increasing its ohmic resistance and drop of potential across the terminals thereof and therefore enabling the magnet 15 to increase in strength sufficiently to close the switch 16. As before pointed out, the closure of the latter will enable the accelerating magnet to close one of its switches and allow more starting current to flow through the motor, that is, sufficient current to start the motor unless the overload is excessive.

Figure 4:
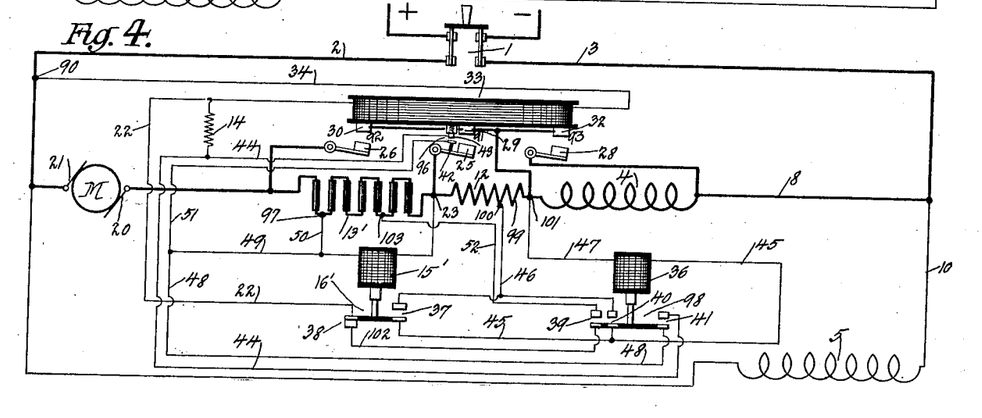

In Fig. 4 is illustrated a modification in which, instead of the self-increasing or high temperature co-efficient resistance 13, a resistance 13′, having a negative temperature co-efficient, is used; that is, the resistance 13′ is formed of a material whose electrical resistance decreases as the temperature rises.

It is well known that certain substances, such as carbon and graphite, or magnetite, have the property of lowering their resistance to the passage of electric current when they are heated by the latter or otherwise. And it is also well known that where one or more resistance elements form part of an electric circuit and the resistance of one element is changed, the drop in potential or the voltage across the terminals of such resistance element will vary.

In Fig. 4, 13′ designates such a self-reducing resistance, comprising in this instance a number of graphite sticks connected in series with each other. The accelerating magnet 33 in this instance has but three switches 91, 92 and 93, and associated with the middle switch 91 is an auxiliary switch 96, comprising a spring-pressed contact 43 and a movable contact 42. 15' designates an electro-magnet for operating the switch 16' and is connected across a portion of the self-reducing resistance 13' between the points 23 and 97. 36 designates an additional magnet for operating the switch 98.

The operation of the system shown in Fig. 4 is as follows. Upon closing the main line switch 1 a circuit is closed through the motor armature, self-reducing resistance 13', resistance 12, series field winding 4, to the negative main by conductor 8. A circuit is also closed through the shunt field winding 5 which is connected directly across the mains. If the motor is required to operate only a normal load the motor will start at once, the current being limited by the starting resistances 13', 12, and the series field winding 4. The accelerating magnet 33 does not receive current immediately, since its circuit is open at the switch 96 and also at the switches 39 and 41. The magnet 15', however, is so adjusted that it at once receives sufficient current to operate the switch 16' by bringing into electrical engagement the contacts 37 and separating the contacts 38. The resistance 13' being a self-reducing resistance, the resistance of the latter is at first comparatively low and consequently maximum current will at first be shunted through the magnet 15'.

Upon the connection of the contacts 37 the magnet 36 will be connected by the conductors 46, 45 and 47 across a portion 99 of the section 12 of the starting resistance between the points 100 and 101. This portion 99 of the resistance 12 will be sufficient to cause the electro-magnet 36 to close the switch 98 or connect the contacts 39, 40 and 41. A circuit for the accelerating magnet will then be closed from the point 90 through the conductor 34, winding of the electro-magnet 33, auxiliary resistance 14, conductor 44, contacts 41, conductors 48, 49 and 50 to the point 97 on the self-reducing resistance 13'. It should be noted that the contacts 38 are still separated and that the switch 96 is open so that no other path is afforded for current passing through the electro-magnet 33. The accelerating magnet 33 is now in series with the resistance 14 in a circuit connected between the points 90 and 97 or across a portion of the armature circuit including the armature and a small portion of the self-reducing resistance 13'. As the speed of the motor increases the counter-electro motive force in the armature will cause the accelerating magnet to become stronger and operate the switch 91 by connecting the armature 25 to the contact 29. Substantially at the same time the switch 96 will be closed by connecting the contacts 42, 43. The closure of the switch 91 short-circuits the section 12 of the starting resistance to permit the motor to run to a higher speed. The short-circuiting of the resistance 12, however, will also short-circuit the magnet 36, whereupon the switch 98 will drop to open position. The contacts 41 are therefore separated and the accelerating magnet would become deënergized were it not for the switch 96 which is closed before the magnet 36 is thus deënergized. Preferably the switch 96 is closed before the switch 91, otherwise the circuit for the accelerating magnet might be interrupted at the contacts 41. As the motor increases in speed the accelerating magnet is still further strengthened by the rising potential across the motor armature until the switch 92 is closed by the connection of the contacts 26 and 30. This causes the resistance 13' to be short-circuited and also the magnet 15'. All of the starting resistance is now cut out and the magnet 15' is deënergized. The switch 16' therefore drops back to its normal position as shown in Fig. 4, that is, the contacts 37 are again separated and the contacts 38 connected. The accelerating magnet increases in strength as the motor increases in speed, until finally the switch 93 is closed by the connection of the armature 28 with the contact 32, thereby short-circuiting the series field winding 4, after which the motor runs at full normal speed as a simple shunt motor. The above described operation as to Fig. 4 takes place each time the motor is started and accelerated, provided the load on the latter is normal or below normal or below a predetermined value.

Again referring to Fig. 4, it should be noted that in case an overload is thrown upon the motor before starting the operation of the system is somewhat different. If it be assumed that such an overload exists and it is desired to start the motor, the normal starting current limited in amount by the resistances 13' and 12 would be insufficient to permit the motor to receive sufficient power to start the load in the manner heretofore explained. Upon the closure of the switch 1 current will flow and the potential across the resistance 13' will be sufficient to enable the magnet 15' to operate the switch 16' to connect the contacts 37 and separate the contacts 38. Due to the connection of the contacts 37 the magnet 36 will receive current and operate the multiple switch 98 to closed position as before. The accelerating magnet 33 and resistance 14 are connected in series with each other in a circuit parallel to the motor armature and a small portion of the resistance 13' connected in series with each other between the points 90 and 97. As the motor is unable to start it does not generate any counter-electro motive force, and therefore the accelerating magnet will not be sufficiently energized to operate any of its switches to cut out the starting resistance. As the self-reducing resistance 13' becomes heated by the flow of the starting current through it the potential across the terminals thereof, and also across the terminals of the magnet 15', becomes lowered, since this resistance comprises substance which lowers in resistance upon becoming heated. It is therefore evident that the potential across the terminals of the magnet 15' becomes less and less until finally the magnet is so weakened, or until the proportion of the current passing therethrough becomes so small that the switch 16' is dropped to its normal position, thus separating the contacts 37 and connecting the contacts 38. A circuit is now closed through the accelerating magnet from the point 90 through conductor 34, winding of the magnet 33, conductor 22, contacts 38, conductor 102, contacts 39, conductor 52 to the point 103 on the resistance 13'. The separation of the contacts 37 does not effect the deënergization of the magnet 36, since the contacts 40 afford the maintenance of a retaining circuit, the section 12 of the starting resistance not being short-circuited at this time.

The accelerating magnet circuit just traced no longer includes the auxiliary resistance 14 and is now connected between the points 90 and 103, or across a portion of the armature circuit including the armature and the larger portion of the resistance 13'. The drop of potential between the points 90 and 103 through the armature is therefore greater and more current will be received by the accelerating magnet to cause the same to close the switches 96 and 91 substantially at the same time or successively in the order mentioned. The resistance 12 is short-circuited by the closure of the switch 91 and the magnet 36 is deënergized to permit the multiple switch 98 to be opened. The separation of the contacts 39 will interrupt the connection of the accelerating magnet to the point 103, but before the contacts 39 separate the switch 96 is closed to again connect the accelerating magnet through the resistance 14 and conductors 51, 49 and 50 to the point 97. As soon as the resistance 12 is short-circuited the starting current is increased so that the overload may be operated. As the motor increases in speed the accelerating magnet will increase in strength to close the switch 92 which will short-circuit the resistance 13'. The last switch 93 will remain open, however, since the motor is unable under the overload conditions to cause the accelerating magnet to receive sufficient current to actuate the last armature 28. The series field winding 4 therefore remains in circuit and the motor continues to rotate at slow speed but with strong torque or as a compound motor.

Figures 5, 6:
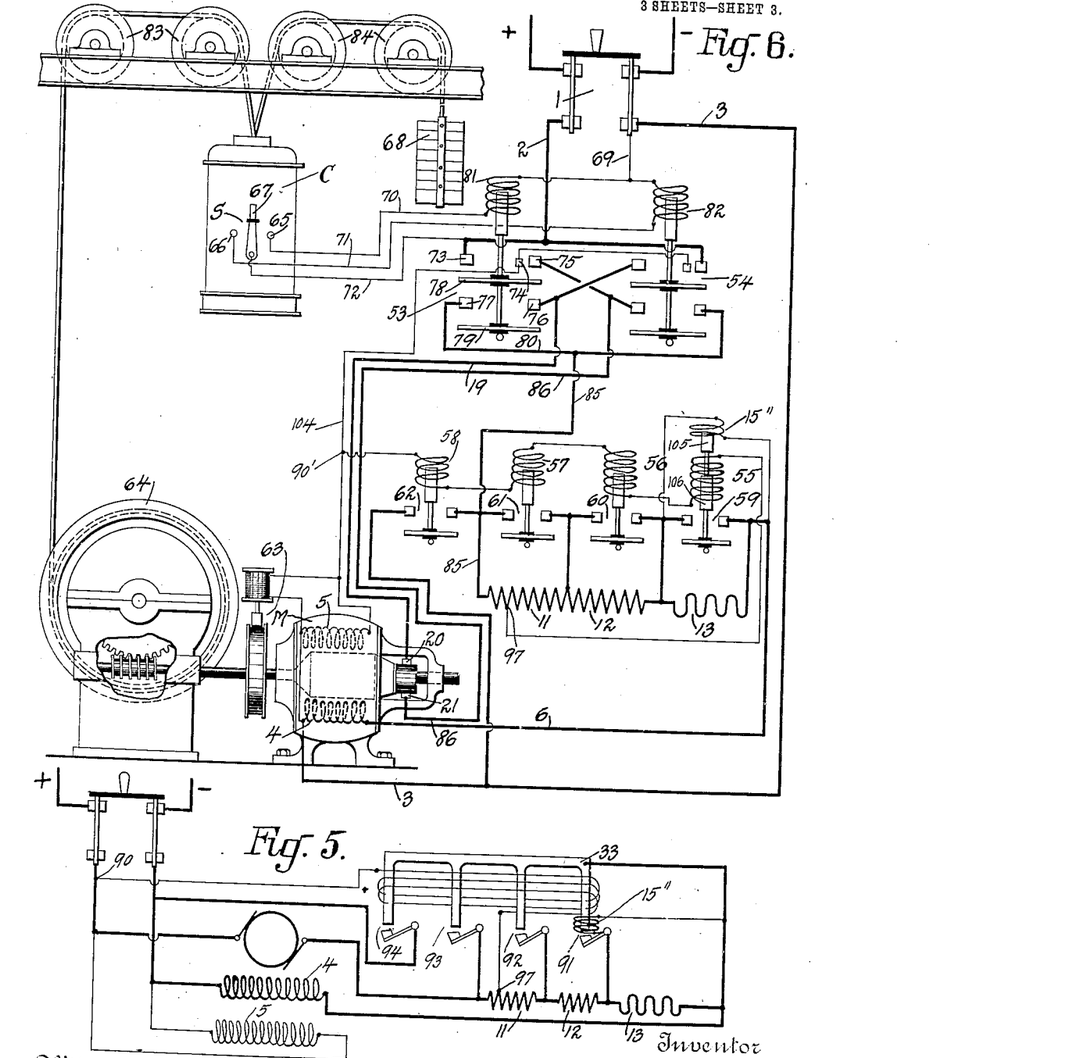
Fig. 6 illustrates the adaptation of my invention to an electric elevator system.

The system shown in Fig. 5 is very much like that shown in Figs. 1, 2 and 3. In this instance a coil 15'' is wound directly on one pole or polar branch of the accelerating magnet core and it is so wound as to assist the winding of the accelerating magnet. As in the other figures, the accelerating magnet, where the load on the motor upon starting is normal, first operates the switches to cut out the starting resistance step by step and finally the series field, permitting the motor to run at full normal speed. But where the motor is overloaded and the same is unable to start, the heat generated in the high temperature co-efficient resistance or self-increasing resistance 13 causes the latter to increase its resistance and the potential across it causes the coil 15'' to receive more current and therefore close the switch 91. The closure of the switch 91 short-circuits the resistance 13 and also the coil 15'', but the accelerating magnet between the points 90 and 97 will have sufficient strength to hold the switch 91 closed. The motor will therefore receive additional starting current and if the motor starts the accelerating magnet will automatically cut out the remaining starting resistance sections 11 and 12 by the operation of the switches 92 and 93. If the motor is so heavily overloaded, however, that it cannot start, no more resistance will be cut out and the latter will simply become heated by the current. The arrangement is preferably such that when the load is beyond normal but less than a predetermined maximum, the current will be increased sufficiently by the automatic cutting out of the resistance 13 that it will start and accelerate, one or more of the last switches, however, remaining open, as that designated 94, so that the series field winding 4 will still remain in circuit. For an overload therefore the motor will be automatically started and accelerated, but its operating speed will be lower than normal, due to the retaining of the series field winding 4 in circuit, but as explained before when the series field winding remains in circuit the torque of the motor is greater, the motor operating as a compound motor instead of as a single shunt motor.

Fig. 6 shows my invention applied to an electric elevator system in which C designates an elevator car suspended by cables, one of which passes over the sheaves 84 and is connected to a counterweight 68, and the other of which passes over the sheaves 83 and is wound about the hoisting drum 64. This drum is connected by intermediate mechanism to an electric motor M. 63 designates electro-magnetic brake apparatus. 53 and 54 designate reversing switches which determine the direction of rotation of the hoisting motor by altering the connections between the main line and the motor armature. These reversing switches are similar in construction and comprise movable plates or bridging members connected to be actuated by electro-magnets including the solenoids 81 and 82. The two contact plates 78 and 79 are connected to but insulated from a rod, to the upper end of which is connected a core or plunger extending into the solenoid 81. In this instance the plates are shown electrically isolated normally by being supported on fixed stops. When the solenoid 81 receives current the plates 78 and 79 are lifted, the former to electrically connect the contacts 73 and 75, and the latter to electrically connect the contacts 77 and 76.

When the switch S in the car C is operated by moving the lever onto the contact 65 a circuit is closed through the main line switch 1 from the positive main through conductors 2, 72 and 70, through the solenoid 81, and thence through the conductor 69 to the negative main. By moving the lever 67 in the opposite direction onto the contact 66 a circuit is closed through the conductor 71 instead of the conductor 70, and thence through the solenoid 82 to the negative main. It should be understood that the reversing switch mechanism, as well as the motor, brake apparatus, and hoisting device and connections, are shown here merely by way of illustration and that these parts may be substituted by others performing similar functions if desired.

The accelerating apparatus comprises a series of electro-magnets and a series of corresponding switches operated thereby to control the starting resistance including as a section thereof the self-increasing resistance 13. It will be noticed that instead of a single magnet having a plurality of polar projections or operating switches, I have in this instance shown a series of electric relays. These relays are so adjusted that the switch 59 will be the first to close to short-circuit the resistance 13, and then the switches 60, 61 and 62 will be operated successively as the motor increases in speed.

The operation of the system illustrated in Fig. 6 is as follows. Upon moving the car switch lever 67 to the right onto the contact 65 a circuit is closed through the solenoid 81 to effect the closure of the switch 53. A circuit is then closed from the positive conductor 2 by way of contacts 73, 78 and 75, conductor 86 to the armature brush 21, and thence through the armature to brush 20, conductor 19, contacts 76, 79 and 77, wires 80 and 85 to one terminal of the resistance 11. The circuit continues through the resistances 11, 12 and 13, conductor 6, series field winding 4 to the conductor 3, and thence to the negative main. A circuit is also closed from the positive main through contacts 73, 78 and 74, conductor 104, the electro-magnet of the brake apparatus 63 and conductor 3 to the negative main. A circuit is also closed from the positive main through conductor 104 and shunt field winding 5 to the negative main. It should also be noted that the terminal 90' is connected through a portion of the conductor 104 and contacts 74, 75 and conductor 86 to the armature brush 21. The other terminal of the circuit including the electro-magnets 58, 57, 56 and 55 is connected to the point 97 on the section 11 of the starting resistance, and thence through the conductor 85, contacts 77, 79, 76, and conductor 19 to the brush 20 of the motor armature. The series of accelerating magnets are therefore connected in series with a portion of the section 11 in a circuit connected directly across the motor armature. The accelerating magnets therefore depend for their operation upon the counter-electro motive force developed in the motor armature.

When the switch 53 is closed by moving the switch lever 67 onto the contact 65 the brake apparatus will be released and the motor will receive current limited by the starting resistance sections 11, 12 and 13, and the same is therefore free to start to operate the hoisting drum 64 to lift or lower the car C. As the motor increases in speed the magnet 55 will be the first to operate to close the switch 59, thus short-circuiting the resistance 13. The electro-magnets 56, 57 and 58 will then operate successively to close the switches 60, 61 and 62, respectively, to cut out step by step the resistances 12 and 11 and the series field winding 4. The motor will then attain its full normal speed.

In order to stop the elevator car the lever 67 is brought back to its central position, thereby opening the circuit of the solenoid 81 which in turn effects the opening of the switch 53, the cutting off of the current from the electro-magnet brake and from the motor. The brake will therefore be applied, that is, spring-pressed brake shoes or other well known means will be brought against the brake pulley on the motor shaft. When the load on the motor exceeds a predetermined normal but is less than a predetermined maximum, and the motor therefore refuses to start upon the closing of one of the reversing switches, the starting current flowing through the starting resistance for a short length of time will heat up such resistance. The section 13 being a self-increasing resistance or a high temperature coefficient resistance will heat more rapidly than the sections 11 and 12. The potential across the terminals of the resistance 13 will therefore increase to such an extent that the winding 15'' connected to such terminals will receive after a predetermined time sufficient current to lift the core 105 connected to the core 106 of the magnet 55. These cores 105 and 106 are so placed with respect to the solenoid 15'' and that of the magnet 55 that when both solenoids receive current they assist each other in tending to close the switch 59. When the armature does not start or when the counter-electromotive force developed in the armature is not sufficient the magnet 55 will not receive sufficient current to close the switch 59, but when the resistance 13 is heated and more current passes through the solenoid 15'' the switch 59 will be closed to short-circuit the resistance 13. This will permit more current to be received by the motor armature, therefore making the motor more powerful at the start to move the overload. After the motor starts it will accelerate in speed and build up counter-electromotive force which shunts more current through the accelerating magnets to cause the latter to operate their switches successively to cut out the remaining sections 12 and 11 of the starting resistance. The load being beyond normal, however, the last switch 62 will remain open so as to retain in circuit the series field winding 4, which as before explained causes the motor to operate as a compound motor having stronger torque than a shunt motor but lower speed. In some cases the switch 61 may also remain open. The number of steps desired in cutting out the starting resistance will depend upon the refinement of operation desired. The successive operation of the accelerating magnets may be obtained in several specifically different ways. For instance, they may have different numbers of ampere turns, or the cores of the magnets may be placed in different relative positions in their respective solenoids.

In all of the figures of the accompanying drawings I have shown my invention applied to an electric motor-controlling system, and particularly to motor-controlling apparatus for an elevator system. It may, however, be readily applied to the electrical control of translating devices other than an electric motor.

Obviously those skilled in the art may make various changes in the details and arrangement of parts without departing from the spirit and scope of my invention and I desire therefore not to be limited to the precise construction and connections herein disclosed.

What I claim and desire to have protected by Letters Patent of the United States is:—

1. In motor-controlling apparatus, the combination with an electric motor, of starting resistance therefor, means for controlling said resistance to effect an acceleration of the motor with normal load, and means permitting the operation of said controlling-means for overload.

2. In motor-controlling apparatus, the combination with an electric motor, of accelerating apparatus therefor, and means for modifying the latter automatically to permit the operation of the same when the load on the motor exceeds a predetermined value.

3. In motor-controlling apparatus, the combination with an electric motor, of accelerating apparatus therefor, and means for modifying the latter to increase the current through the motor armature and to strengthen said accelerating apparatus.

4. The combination with an electric motor, of sectional starting resistance, electromagnetic switch mechanism for controlling said resistance, and means operative after a predetermined time for modifying said mechanism to permit the operation of the latter even when the load on the motor exceeds a normal starting or running value.

5. In motor-controlling apparatus, the combination with an electric motor, of sectional starting resistance therefor, electromagnetic mechanism for varying said resistance to effect an acceleration of the motor, means for automatically strengthening said electro-magnetic mechanism when the load on the motor exceeds a predetermined value, and connections to reëstablish the normal circuit of the electro-magnetic mechanism after the motor attains a predetermined speed.

6. The combination with an electric motor, of starting resistance, a series of switches for varying said resistance, electro-magnetic means for operating said switches successively to cut out the said resistance step by step and effect an acceleration of the motor, an electro-responsive device operated upon variation of the drop of potential along a portion of said resistance to a predetermined value to change the circuit of the said electro-magnetic means to strengthen the same when the latter does not operate said switches after a predetermined length of time, and connections effecting the cutting out of said electro-responsive device and the restoration of the circuit of said electro-magnetic means when the first switch is operated.

7. The combination with an electric motor, of starting resistance therefor, part being of low temperature coefficient and part being of comparatively high temperature coefficient, means for automatically cutting out said resistance gradually as the motor increases in speed, and means dependent upon increase of potential drop in said high temperature coefficient resistance to effect the operation of said cutting-out-means when the motor does not start or does not increase in speed sufficiently to cause the operation of said cutting-out-means.

8. The combination with an electric motor, of starting resistance therefor comprising a plurality of sections, one of said sections being of comparatively high temperature coefficient, means for automatically cutting out said sections successively, and appliances dependent upon increase of potential drop in said section of high temperature coefficient to effect the operation of said cutting-out-means when the load on the motor exceeds a predetermined value.

9. In motor-controlling apparatus, the combination with a compound-wound motor, of a resistance of low temperature coefficient and a resistance of high temperature coefficient both in series with the motor armature and the series field winding, electric switches for cutting out said resistances, electro-magnetic means for operating said switches, and an electro-responsive device operated automatically to strengthen said electro-magnetic means when the load on the motor exceeds a predetermined value.

10. In motor-controlling apparatus, the combination with a motor armature and a series field winding, of a resistance of high temperature coefficient in circuit with said motor armature and series field winding, multiple electro-magnetic switch mechanism for cutting out said resistances in steps to effect a gradual acceleration of the motor, and means dependent upon variation of drop of potential across said resistance to effect a strengthening of said electro-magnetic mechanism.

11. In motor-controlling apparatus, the combination with a motor armature, a shunt field winding and a series field winding, of a resistance of high temperature coefficient and a resistance of low temperature coefficient in series with the motor armature and series field winding, electro-magnetic switch mechanism for cutting out said resistances and said series field winding in steps to effect a gradual acceleration of the motor, and means dependent upon variation of potential along one of said resistances to strengthen said electro-magnetic mechanism when the load on the motor exceeds a predetermined value.

12. In motor-controlling apparatus, the combination with a shunt wound motor, of a resistance of high temperature coefficient and a resistance of low temperature coefficient in series with the motor armature, automatic apparatus for cutting out said resistances step by step, and means dependent upon variation of drop in potential in one of said resistances to strengthen said apparatus when the load on the motor exceeds a predetermined value or its speed of rotation does not reach a predetermined value after the lapse of a predetermined time.

13. The combination with an electric motor, of a sectional starting resistance therefor comprising a section of comparatively high temperature coefficient and a section of low temperature coefficient, means for successively and automatically cutting out said sections as the motor increases in speed, beginning with a section of high temperature coefficient, and means dependent upon increase of potential drop in said section of high temperature coefficient to effect the operation of said cutting-out-means by increasing the current therein when the load on the motor is so great as to prevent sufficient counter-electromotive force to be produced to effect the operation of said cutting-out-means.

14. In motor-controlling apparatus, the combination with an electric motor, of sectional starting resistance therefor comprising a section of high temperature coefficient and a section of low temperature coefficient wherein the drop of potential increases as such section is heated by current flow, electro-magnetic means for successively cutting out said sections of the starting resistance, an electro-magnet connected across said section of high temperature coefficient, and a switch controlled by said electro-magnet for varying the electrical connection of said electro-magnetic means to effect the operation of the latter even when the load on the motor exceeds a predetermined value.

15. In motor-controlling apparatus, the combination with an electric motor, of sectional starting resistance therefor comprising a section of high temperature coefficient and a section of low temperature coefficient, the drop of potential in the section of high temperature coefficient increasing due to heating by electric current flow, an electro-magnet connected across the motor armature, a series of switches controlled by said electro-magnet for successively cutting out said sectional starting resistance, beginning with said section of high temperature coefficient as the motor increases in speed, an electro-magnet connected to said section of high temperature coefficient so as to be dependent for its energization upon the variation of the drop in potential in said section, and a switch controlled by said last-named electro-magnet to vary the connection of said accelerating magnet to effect an increase of potential applied to the latter to increase its power when the load on the motor is so great as to prevent it from starting or from increasing sufficiently in speed to build up suffcent counter-electromotive force to effect the normal operation of said accelerating electro-magnet.

16. In motor-controlling apparatus, the combination with an electric motor, of an accelerating magnet, a resistance connected in series with said accelerating magnet in a circuit across the motor armature, starting resistance partly of high temperature coefficient and partly of low temperature coefficient, a plurality of switches controlled by said accelerating magnet to cut out sections of the starting resistance as the motor increases in speed, an electro-magnet connected to the section of high temperature coefficient so as to be dependent for its energization upon the drop of potential in said section, and a switch operated by said electro-magnet after current flows through said section a predetermined length of time to connect one terminal of the accelerating magnet at an intermediate point in the sectional starting resistance to effect an increase of potential applied to said accelerating magnet.

17. In motor-controlling apparatus, the combination with an electric motor, of an accelerating magnet, a resistance connected in series with said magnet in a circuit connected directly across the motor armature, sectional starting resistance in series with the motor armature and comprising a section of low temperature coefficient and a section of comparatively high temperature coefficient, the drop of potential increasing rapidly in the latter due to heating by the current, a plurality of switches operated by said electro-magnet to successively cut out the sections of the starting resistance beginning with a section of high temperature coefficient, an additional magnet connected to separated points along said section of high temperature coefficient, and a switch operated by said additional electro-magnet to short-circuit said first-named resistance and a portion of the sectional starting resistance to increase the power of the accelerating magnet when the motor armature does not increase in speed due to a load thereon exceeding a normal maximum.

18. In motor-controlling apparatus, the combination with a compound-wound motor, of sectional starting resistance in circuit with the motor armature and series field winding, a part of said resistance being composed of material to rapidly change the drop of potential along the latter due to heating therein, an accelerating magnet connected in a circuit across the motor armature, an electro-responsive device dependent upon the aforesaid variation of potential to change the connection of said accelerating magnet to increase the potential applied thereto when the motor does not start after a predetermined length of time, switches operated by said accelerating magnet to gradually cut out said resistance and series field when the load on the motor is below a predetermined value and to leave in circuit said series field winding or a portion thereof when the load exceeds a predetermined value, and connections to effect the cutting out of the electro-responsive device and the said part of the starting resistance appreciably affected by heat to restore the circuit of the accelerating magnet when the first switch is operated by the latter.

19. In motor-controlling apparatus, the combination with an electric motor, of starting resistance therefor, a part of which is of high temperature coefficient, accelerating electro-magnetic mechanism, a plurality of switches operated by said electro-magnet mechanism to cut out said starting resistance step by step, and an electro-magnet winding co-acting with a portion of the electro-magnetic mechanism to increase the action of the latter after current has flowed through said part of high temperature coefficient a predetermined length of time.

20. In an elevator, the combination with a car, hoisting apparatus, and an electric motor, of reversing switches for the motor, a plurality of sections of starting resistance, one of said sections changing its resistance rapidly and automatically due to heating by current flow, a plurality of electro-magnetic switches for cutting out successively said sections of starting resistance, beginning with the section along which the drop in potential varies rapidly after current begins to pass therethrough, and an auxiliary electro-magnet connected across said section appreciably affected by heat to assist the electro-magnet of the switch controlling said last-named section.

In testimony whereof, I have signed my name to this specification in the presence of two subscribing witnesses.

ERNEST L. GALE, Sr.

Witnesses:
CHAS. M. NISSEN,
JAMES G. BETHELL.